United States Patent [19]
Schmidt, Jr.

[11] 3,814,257
[45] June 4, 1974

[54] FILTER CAKE COMPRESSION SYSTEM
[75] Inventor: Henry Schmidt, Jr., Hinsdale, Ill.
[73] Assignee: Industrial Filter & Pump Mfg. Co., Cicero, Ill.
[22] Filed: Aug. 16, 1972
[21] Appl. No.: 281,053

[52] U.S. Cl............................ 210/332, 210/350
[51] Int. Cl........................................ B01d 33/36
[58] Field of Search ............ 210/332, 350, 507, 351

[56] References Cited
UNITED STATES PATENTS
1,222,100  4/1917  Hanson.............................. 210/507
3,017,996  1/1962  Riley................................ 210/351 X
3,708,072  1/1973  Schmidt, Jr..................... 210/350 X Primary Examiner—Frank A. Spear, Jr.
Attorney, Agent, or Firm—Edmond T. Patnaude

[57] ABSTRACT

A filter cake compression system employs a dual surfaced flexible member resiliently supported about its periphery adjacent to a filter leaf, said member having an impervious back surface and an open pore, woven fabric facing the filter leaf.

8 Claims, 4 Drawing Figures

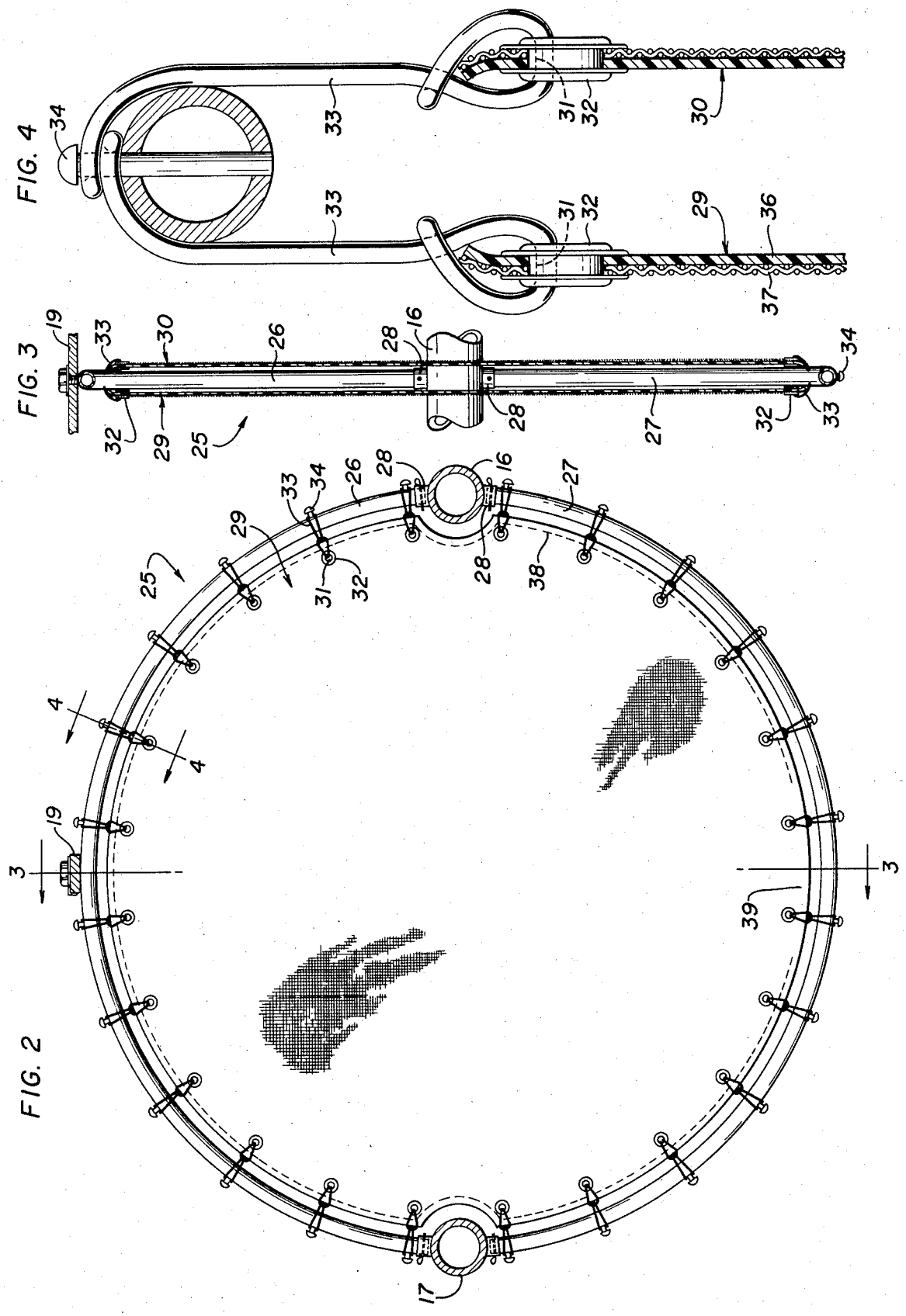

FILTER CAKE COMPRESSION SYSTEM

The present invention relates in general to filters for removing entrained solids from a liquid, and it relates more particularly to a filter cake compression system such as disclosed in my copending application Ser. No. 080,270 filed on Oct. 13, 1970, now U.S. Pat. No. 3,708,072.

BACKGROUND OF THE INVENTION

The said copending application discloses an automatic filter cake compression system wherein a flexible sheet of impervious material mounted on the upstream side of a filter leaf is forced toward the leaf to compress the filter cake between the sheet and the leaf. It has been found that in some cases where the outer surfaces of the cakes are extremely soft and only slightly thicker than the feed liquid, the compressed cake tenaciously adheres to the compression sheet and is pulled away from the leaf when the sheet is backed off upon completion of the cake compression operation. Where the sheet is resiliently supported, removal of the cake therefrom becomes difficult since the usual vibration system is not particularly effective. Also, damage to the cake compression sheets and to the associated suspension system sometimes occurs because of the overload placed thereon by the heavy filter cakes which adhere thereto after being pulled away from the leaves.

I have determined that the filter cake adheres to the compression sheet due to a vacuum created between the sheet and the adjacent face of the cake when the sheet moves back from the filter leaf. Since the outer face of the cake is usually very soft and wet at the beginning of the compression operation, a close fit between the smooth face of the sheet and the cake is assured with the consequent suction occurring between the sheet and the cake.

OBJECTS OF THE INVENTION

An object of the present invention is, therefore, to provide means for effecting separation of an imperforate cake compression sheet when the sheet is backed off from a compressed cake.

Another object is to provide improved dewatering of a filter cake deposited on a filter element.

A further object is to provide a new and improved suspension system for a flexible, cake compression diaphragm.

SUMMARY OF THE INVENTION

Briefly, the above and further objects may be realized in accordance with the present invention by resiliently suspending a dual surface sheet in parallel, spaced apart relationship with the cake supporting surface of a filter leaf. The sheet has an open grid-like surface facing the leaf and an impervious back surface. The grid-like surface is, however, relatively smooth for good cake release and has sufficient depth and pore size to provide drainage and venting between the compressed cake and the impervious back surface. Also, the pore size must be sufficiently small to prevent plugging or packing of the grid by the initially soft, mud-like outer surface of the cake.

BRIEF DESCRIPTION OF THE DRAWINGS

Further objects and advantages and a better understanding of the invention may be had from the following detailed description taken in connection with the accompanying drawings, wherein:

FIG. 2 is a view of a cake compression assembly taken along the line 2—2 of FIG. 1;

FIG. 3 is a sectional view taken along the line 3—3 of FIG. 2; and

FIG. 4 is an enlarged fragmentary view particularly illustrating the manner in which the compression sheets are supported.

DETAILED DESCRIPTION OF THE DRAWINGS

Figure 1:
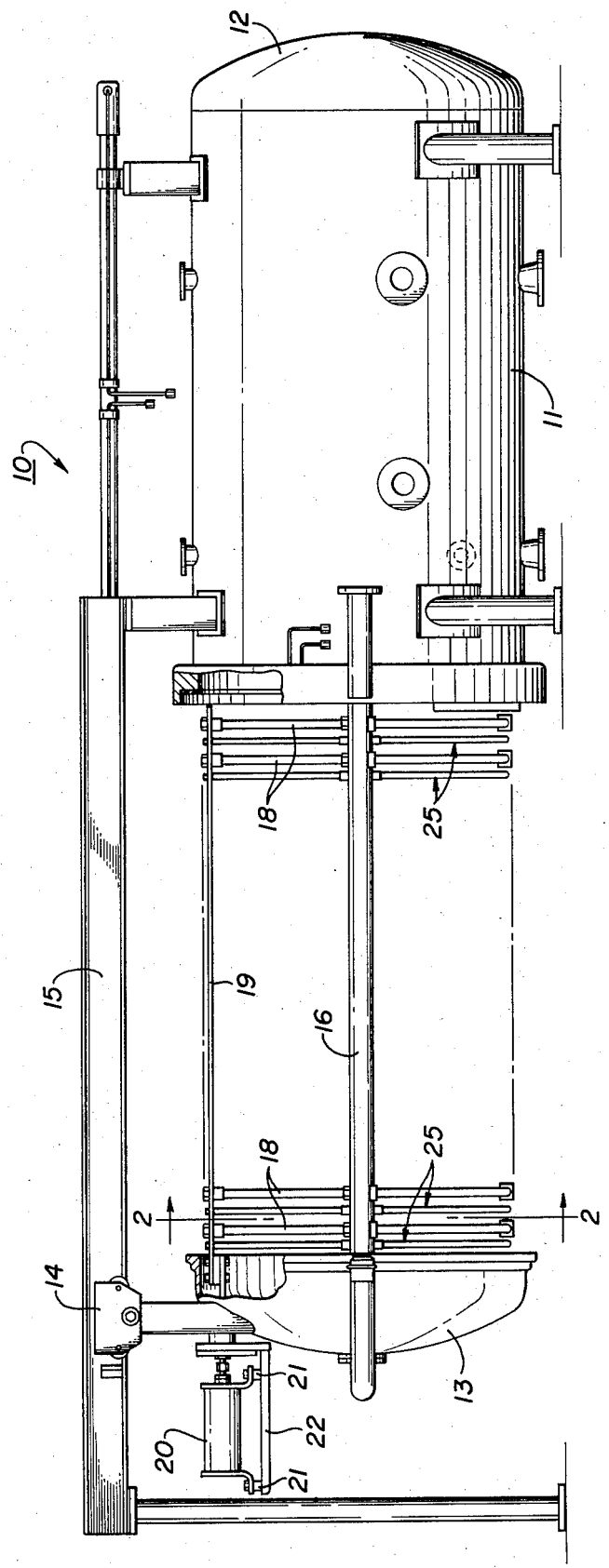
FIG. 1 is an elevational view of a filter embodying the present invention, the bank of filter leaves being shown withdrawn from the tank.

Referring now to the drawings and particularly to FIG. 1 thereof, there is shown a horizontal type pressure leaf filter 10 including as its principal components a tank 11 sealably closed at one end by a fixed end member 12 and provided at its other end with a horizontally movable cover 13 supported by a pair of trolleys 14 which ride in a pair of rails 15. A pair of outlet manifolds 16 and 17 are supported by the cover 13 and, as best shown in FIG. 2, are disposed in a common horizontal plane and are positioned on opposite sides of a plurality of filter leaves 18 mounted in spaced apart, mutually parallel relationship. As thus far described, the filter 10 is conventional and the filter leaves 18 are mounted on the manifolds 16 and 17 with the interior cavities in the filter leaves in communication with the passageways through the manifolds 16 and 17. The filter leaves 18 are fixedly connected at the tops to a rigid vibrator bar 19 which connects to a reciprocatory impactor 20 mounted by shock absorber means 21 on a shelf 22 fixedly supported by the cover member 13.

In order to automatically terminate flow through the respective filter leaves 18 and to compress the filter cakes deposited thereon, there is provided in accordance with the teachings of the present invention a plurality of cake compression assemblies 25 respectively mounted between adjacent ones of the filter leaves 18. As best shown in FIG. 2, each of the assemblies 25 includes a pair of arcuate rigid support members 26 and 27 whose respective ends are received and fastened in a plurality of tubular connectors 28 which are fixedly connected as by welding to the outlet manifolds 16 and 17. Resiliently supported within the ring thus formed by the arcuate members 26 and 27 and the manifolds 16 and 17 is a pair of dual surfaced flexible sheets 29 and 30 which are each generally circular in shape. The sheets 29 and 30 are slightly larger than the corresponding faces of the filter leaves 18 and include a plurality of peripherally disposed apertures 31 defined by grommets 32 and used to attach the sheets 29 and 30 to the arcuate segments 26 and 27 by means of a plurality of resilient loop members 33. A plurality of headed studs 34 are fixed to the members 26 and 27 in positions corresponding to the locations of the grommets 32 and, as best shown in FIG. 4, the resilient rings 33 are secured to the sheets 29 and 30 through the grommets and are stretched over the heads of the studs 34 onto the body portions thereof outwardly of the arcuate members 26 and 27. In this manner the sheets 29 and 30 are mutually spaced apart and are held in a taut position by the loops 33.

In accordance with an important feature of the present invention, each of the sheets 29 and 30 includes a relatively smooth faced impervious sheet 36 of flexible material and a woven fabric sheet 37 secured thereto and facing toward the adjacent filter leaf. In one embodiment of the invention, the sheets 36 and 37 are secured together only near the peripheries thereof in a sewing operation which provides a generally peripheral stitch 38. As shown in FIG. 2, the stiching 38 is terminated at the bottom of the leaf to provide an open area 39 to permit better back drainage between the sheets 36 and 37. In an alternative embodiment of the invention, the sheets 36 and 37 are bonded together into a unitary sheet. In both cases, however, the sheet 37 is a woven material which provides interconnecting passageways inwardly of the outer face thereof adjacent the adjoining face of the impervious sheet 36.

OPERATION

In operation, the bank of filter leaves 18 is positioned within the tank 11 and the cover 13 is sealed thereto. The liquid to be filtered is then supplied into the filter chamber and flows through the perforate faces of the filter leaves 18 into the manifolds 16 and 17 from which it exits the filter in a clarified condition. The entrained solids carried into the tank by the liquid are deposited on the faces of the filter leaves 18 and form filter cakes which continue to build up and increase in thickness until each cake respectively reaches the adjacent one of the sheets 29 or 30. When this occurs the pressure at the interface between each cake and the respective compression sheet falls below tank pressure which thus forces the compression sheet toward the adjacent filter leaf. Upon completion of the cake compression operation the resilient loops are expanded and the sheets 29 and 30 have moved outwardly of the supporting ring towards the adjoining filter elements. The pressure in the tank is then relieved whereby the inherent resiliency of the loops 33 pulls the sheets 29 and 30 back to their original positions within the supporting ring. By virtue of the interwoven grid-like surface 37 which engages the cakes, any suction which would otherwise be created between the compression sheets 29 and 30 and the filter cakes is relieved whereby the compressed cakes remain on the filter leaves. Thereafter the bank of filter leaves is withdrawn from the tank and operation of the vibratory impactor 30 is initiated to shake the cakes loose from the filter leaves. The cakes thus fall downwardly between the manifolds 16 and 17 into a suitable container, pit or the like (not shown).

I have found that a particularly good fabric for the grid 37 is an eight-harness satin weave of polypropylene mono-filament with a pore size varying between 25 and 50 microns. Such material is conventionally used as a filter cloth suitable for retaining a diatomaceous earth precoat material.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. In filtering apparatus of the type wherein a porous filter cake is deposited and builds up on a perforate facial surface of a filter leaf, the combination comprising a flexible imperforate sheet having a grid surface formed of interwoven filaments on one side, and
means resiliently supporting said sheet in spaced parallel relationship with said perforate facial surface on the upstream side thereof and with said grid surface facing said perforate facial surface of said filter leaf.

2. The combination set forth in claim 1, wherein said grid surface comprises is an open weave fabric fastened to an
imperforate sheet.

3. The combination set forth in claim 2, wherein said fabric is fastened to said imperforate sheet near
the perimeter thereof.

4. The combination set forth in claim 2, wherein said fabric is bonded to said sheet throughout the
adjacent surface areas thereof to provide a unitary member.

5. In filtering apparatus of the type wherein a porous filter cake builds up on a perforate facial surface of a filter leaf, the improvement comprising
a sheet of imperforate flexible material,
a support ring mounted in spaced apart parallel relationship with said facial surface and surrounding said sheet in coplanar relationship therewith, and a plurality of resilient members secured between said ring and said sheet for holding said sheet.

6. The improvement set forth in claim 5, wherein
said sheet is provided with a plurality of spaced apart openings near the edge thereof, and
said resilient members are elastomeric rings respectively connected to said sheet through said openings.

7. The improvement set forth in claim 5, wherein said filter includes
a pair of rigid members extending along opposite sides of said filter leaf, and
said support ring comprises a pair of generally U-shaped members respectively connected between said rigid members.

8. The improvement set forth in claim 7, wherein at least one of said rigid members is an outlet manifold.

* * * * *